US012637835B2

(12) United States Patent (10) Patent No.: US 12,637,835 B2
Kumagai et al. (45) Date of Patent: May 26, 2026

(54) CONSTRUCTION MACHINE

(71) Applicant: Hitachi Construction Machinery Co., Ltd., Tokyo (JP)

(72) Inventors: Hiroshi Kumagai, Ryugasaki (JP); Hiroaki Fujishima, Tsuchiura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 309 days.

(21) Appl. No.: 18/280,720

(22) PCT Filed: Mar. 11, 2022

(86) PCT No.: PCT/JP2022/010982
§ 371 (c)(1),
(2) Date: Sep. 7, 2023

(87) PCT Pub. No.: WO2023/276296
PCT Pub. Date: Jan. 5, 2023

(65) Prior Publication Data
US 2024/0141615 A1 May 2, 2024

(30) Foreign Application Priority Data

Jun. 30, 2021 (JP) ................................. 2021-108768

(51) Int. Cl.
*E02F 9/08* (2006.01)
*B60K 15/04* (2006.01)
*B60K 15/03* (2006.01)

(52) U.S. Cl.
CPC ............ *E02F 9/0866* (2013.01); *B60K 15/04* (2013.01); *E02F 9/0883* (2013.01);
(Continued)

(58) Field of Classification Search
CPC ...... E02F 9/0866; E02F 9/0883; B60K 15/04; B60K 2015/03236; B60K 2015/03243
See application file for complete search history.

(56) References Cited

U.S. PATENT DOCUMENTS 10,174,482 B2 * 1/2019 Todokoro .............. E02F 9/0808
10,640,949 B2 * 5/2020 Hirasawa .............. E02F 9/0883
(Continued)

FOREIGN PATENT DOCUMENTS

GB 542057 A 12/1941
JP 2003-328887 A 11/2003
(Continued)

OTHER PUBLICATIONS

International Search Report (PCT/ISA/210) issued in PCT Application No. PCT/JP2022/010982 dated May 24, 2022 with English translation (4 pages).
(Continued)

*Primary Examiner* — Brian L Swenson
(74) *Attorney, Agent, or Firm* — Crowell & Moring LLP

(57) ABSTRACT

A fuel filling device (18) for refueling a fuel tank (14) is disposed in the vicinity of an exhaust gas post-treatment device (10). Specifically, the fuel filling device (18) is disposed over a hydraulic pump (11) provided to an engine (9) and at a height position equivalent to the exhaust gas post-treatment device (10). Therefore, the fuel filling device (18) can be heated for a short period of time by the exhaust gas post-treatment device (10) which is exposed to high temperature soon after the start of the engine (9).

11 Claims, 10 Drawing Sheets

(52) U.S. Cl.
 CPC .. E02F 9/0891 (2013.01); B60K 2015/03236
  (2013.01); B60K 2015/03243 (2013.01)

(56) References Cited

U.S. PATENT DOCUMENTS

| | | | | |
|---|---|---|---|---|
| 2012/0067660 A1* | 3/2012 | Kashu | .................... | E02F 9/0883 |
| | | | | 280/830 |
| 2014/0023473 A1* | 1/2014 | Kobayashi | ............ | E02F 9/0858 |
| | | | | 414/687 |
| 2015/0016932 A1* | 1/2015 | Azuma | ................... | E02F 9/121 |
| | | | | 414/687 |
| 2018/0274423 A1* | 9/2018 | Kubota | ................. | E02F 9/0883 |
| 2018/0291590 A1* | 10/2018 | Tabeta | ...................... | E02F 9/00 |
| 2021/0363725 A1* | 11/2021 | Manna | ................. | B60K 15/063 |
| 2021/0381196 A1* | 12/2021 | Fujishima | ............. | E02F 9/2267 |

FOREIGN PATENT DOCUMENTS

| | | | |
|---|---|---|---|
| JP | 2004-217141 A | 8/2004 |
| JP | 2017-166224 A | 9/2017 |
| JP | 2020-2729 A | 1/2020 |

OTHER PUBLICATIONS

Japanese-language Written Opinion (PCT/ISA/237) issued in PCT
Application No. PCT/JP2022/010982 dated May 24, 2022 with
English translation (7 pages).
Chinese-language Office Action issued in Chinese Application No.
202280017860.9 dated Nov. 28, 2025 with partial English transla-
tion (12 pages).

* cited by examiner

Fig. 9

CONSTRUCTION MACHINE

TECHNICAL FIELD

The present invention relates to a construction machine with a fuel filling device supplying fuels from an external oil reservoir tank to a fuel tank, for example.

BACKGROUND ART

A hydraulic excavator is generally configured, as a representative type of construction machine, to include a lower traveling structure, an upper revolving structure disposed rotatably on the lower traveling structure and a working mechanism mounted disposed rotatably at a front portion of the upper revolving structure.

The upper revolving structure includes a revolving frame, a counterweight disposed on a rear side of the revolving frame, an engine located on a front side of the counterweight and transversely disposed on the revolving frame, an exhaust gas post-treatment device disposed on an upper right side of the engine, a hydraulic pump disposed on the right side of the engine, a fuel tank located on a front side of the hydraulic pump and disposed on the right side of the revolving frame, and a fuel filling device with a fuel pump, a fuel filter and a connecting pipe for refueling the fuel tank (Patent Documents 1, 2). When a fuel tank of a hydraulic excavator is refueled, a fuel filling device can be used to automatically refuel the fuel tank from an external oil reservoir tank.

PRIOR ART DOCUMENT

Patent Document
Patent Document 1: Japanese Patent Laid-Open No. 2003-328887 A
Patent Document 2: Japanese Patent Laid-Open No. 2017-166224 A

SUMMARY OF THE INVENTION

Hydraulic excavators are operated even in cold areas. Hydraulic excavators operated at a working site in such cold areas are prone to higher viscosity of wax constituents in fuels at lower temperature, i.e., "waxing". For example, fuels supplied to a fuel tank using a fuel filling device remain in a fuel pump, a fuel filter, a connecting pipe and so on. Residual fuels in the fuel pump, the fuel filter, the connecting pipe and so on are more likely to cause waxing due to reduced temperature than fuels in the fuel tank. One such countermeasure to prevent waxing from the residual fuels in the fuel pump, the fuel filter, the connecting pipe and the like is to heat a fuel filling device, for example, resulting in lower operational efficiency for refueling.

In view of the above-described problems of conventional technologies, an object of the present invention is to provide a construction machine capable of improving the operational efficiency for refueling by overcoming waxing of a fuel filling device for a short period of time.

The present invention provides a construction machine, including a lower traveling structure and an upper revolving structure disposed rotatably on the lower traveling structure, the upper revolving structure including: an engine; an exhaust gas post-treatment device treating exhaust gas discharged from the engine; a fuel tank storing fuels; and a fuel filling device refueling the fuel tank, wherein the fuel filling device is disposed in the vicinity of the exhaust gas post-treatment device.

According to the present invention, the construction machine can overcome waxing in a fuel filling device for a short period of time and improve the operational efficiency for refueling.

BRIEF DESCRIPTION OF THE DRAWINGS

FIG. 3 is a right side view showing the upper revolving structure without a cab, a hydraulic oil tank, an exterior cover, or the like.

FIG. 7 is a perspective view showing a fuel filling device attached to a partition member and the like.

FIG. 8 is a perspective view showing the partition member, a frame member and the like.

FIG. 9 is a bottom view showing the fuel filling device viewed from the lower side.

MODE FOR CARRYING OUT THE INVENTION

A construction machine according to an embodiment of the present invention, by taking the case of a crawler-type hydraulic excavator, will be explained in detail with reference to FIGS. 1 to 10. In addition, an embodiment illustrates a rear ultra small sized turn type hydraulic excavator that allows the trajectory of an outer peripheral surface of a counterweight to be accommodated within a range of 120% of a width dimension (dimension in the right-and-left direction) of the lower traveling structure when the upper revolving structure revolves.

Figure 1:
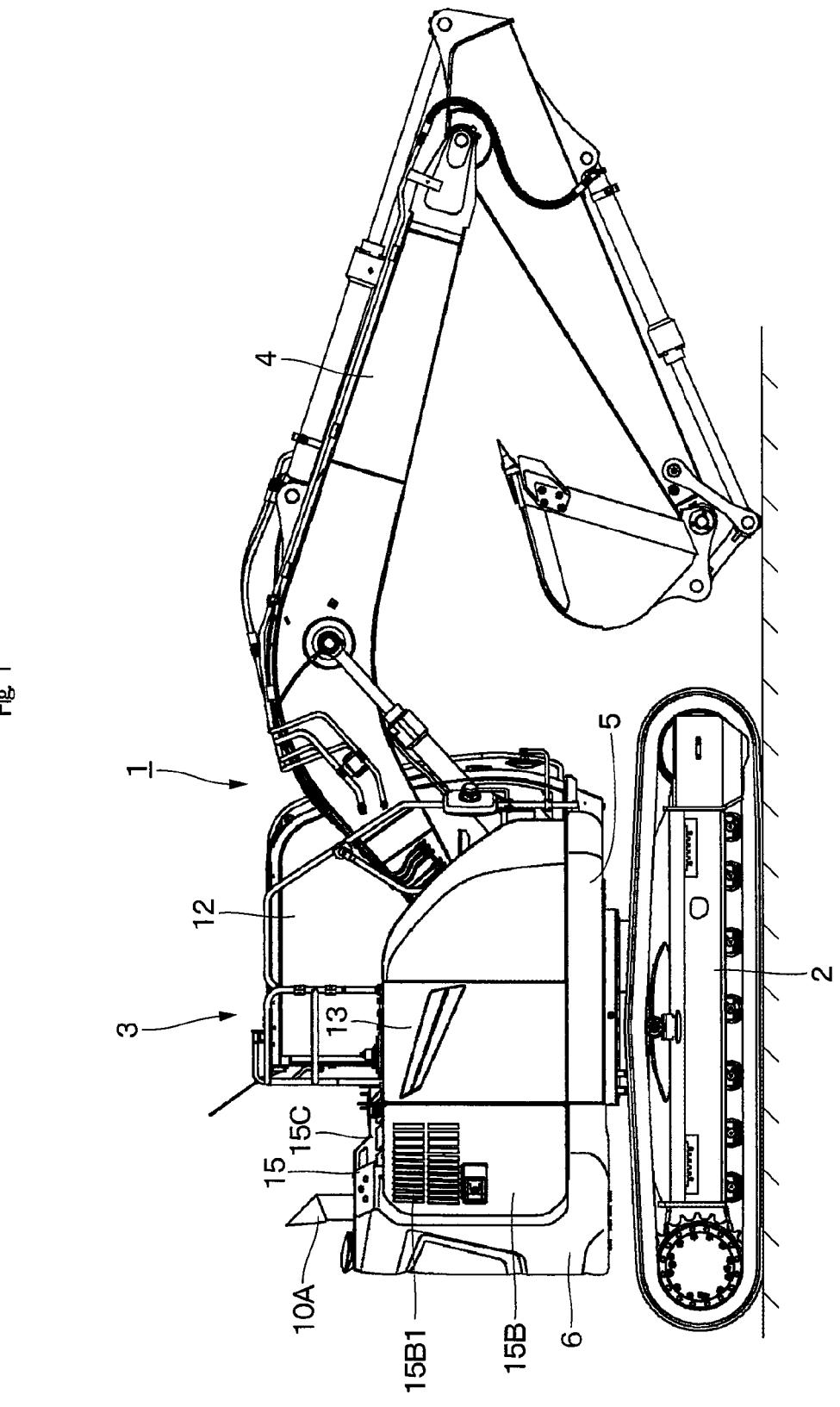
FIG. 1 is a right side view showing a hydraulic excavator applied to an embodiment of the present invention.
Figure 2:
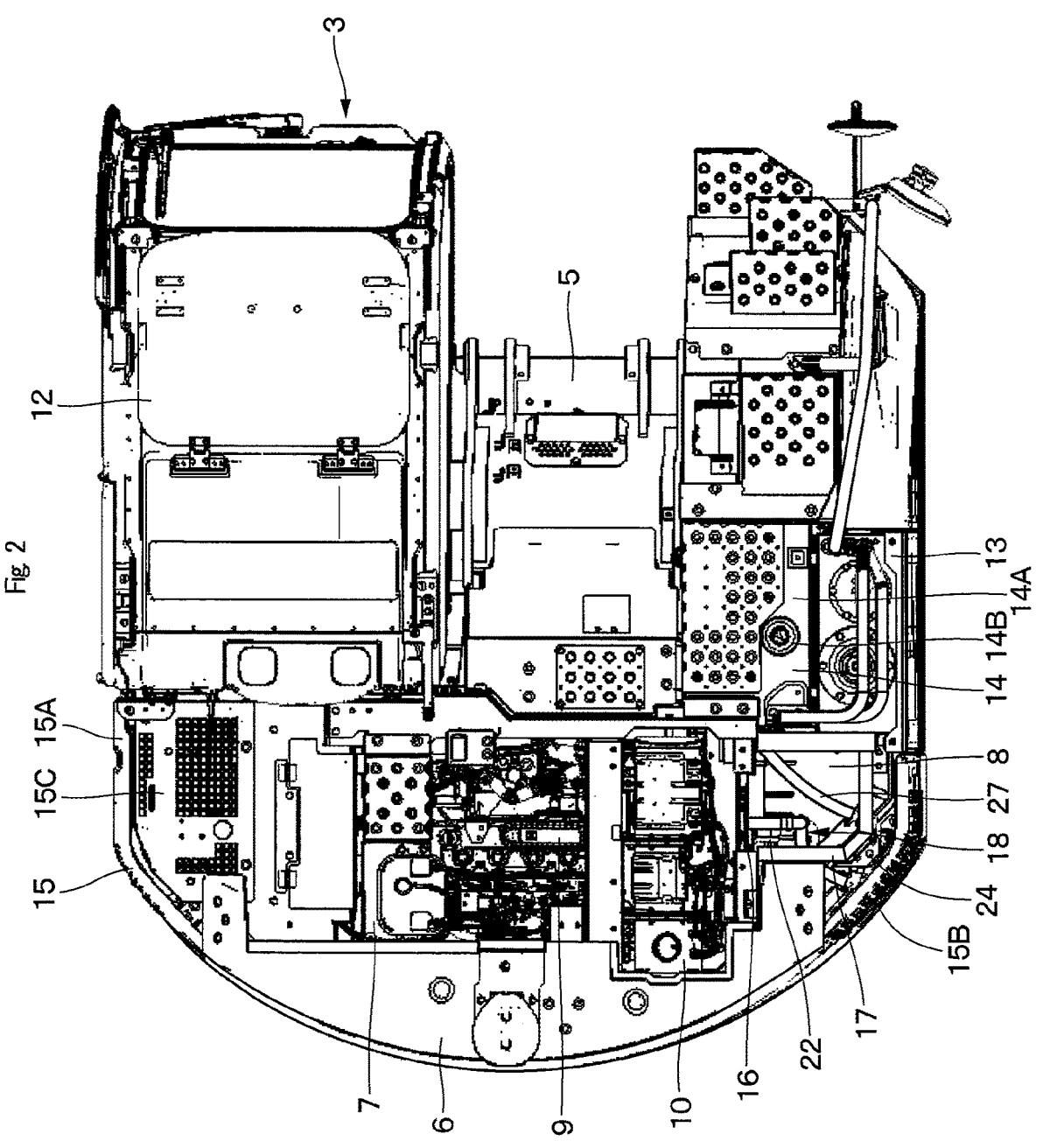
FIG. 2 is a plan view showing an upper revolving structure in FIG. 1 without part of an exterior cover.

In FIGS. 1 and 2, a hydraulic excavator 1 is configured to include a self-propelled crawler-type lower traveling structure 2, an upper revolving structure 3 disposed rotatably on the lower traveling structure 2, and a working mechanism 4 disposed rotatably at a front portion of the upper revolving structure 3. The upper revolving structure 3 is configured to include a revolving frame 5, a counterweight 6, an engine 9, an exhaust gas post-treatment device 10, a hydraulic pump 11, a fuel tank 14, an exterior cover 15, a partition member 16, and a fuel filling device 18.

The revolving frame 5 is configured as a support structure attached to the lower traveling structure 2 via a revolving apparatus (not shown). The working mechanism 4 is attached rotatably to a front portion of the revolving frame 5.

The counterweight 6 is disposed on a rear side of the revolving frame 5. As shown in FIG. 2, the counterweight 6 is formed as an arc shape, with a center part in the right-and-left direction projecting rearward. The counterweight 6 takes a weight balance with the working mechanism 4.

Herein, an engine room 7, which is located between a later-described counterweight 6 and a cab 12, and between the counterweight 6 and a hydraulic oil tank 13 or the fuel tank 14, is formed on the rear side of the revolving frame 5. In addition, a cooling air inflow chamber parted by a heat exchanger is formed on the left side of the engine room. 7 (each not shown). Meanwhile, a pump room 8, which is parted by the later-described partition member 16, is formed on the right side of the engine room 7. The later-described fuel filling device 18 is disposed in the pump room 8.

The engine 9 is located on a front side of the counterweight 6 and is transversely disposed on the revolving frame 5. Specifically, the engine 9 is disposed in the engine room 7. The engine 9 is configured as a diesel engine, for example. A heat exchanger such as a radiator cooling engine cooling water and an oil cooler cooling hydraulic oil (each not shown) with cooling air sucked by a rotation of a cooling fan are disposed on the left side of the engine 9. On the other hand, the engine 9 includes an exhaust pipe (not shown) for discharging exhaust gas. The exhaust pipe is connected to the exhaust gas post-treatment device 10. The hydraulic pump 11 is attached on the right side of the engine 9.

Figure 4:
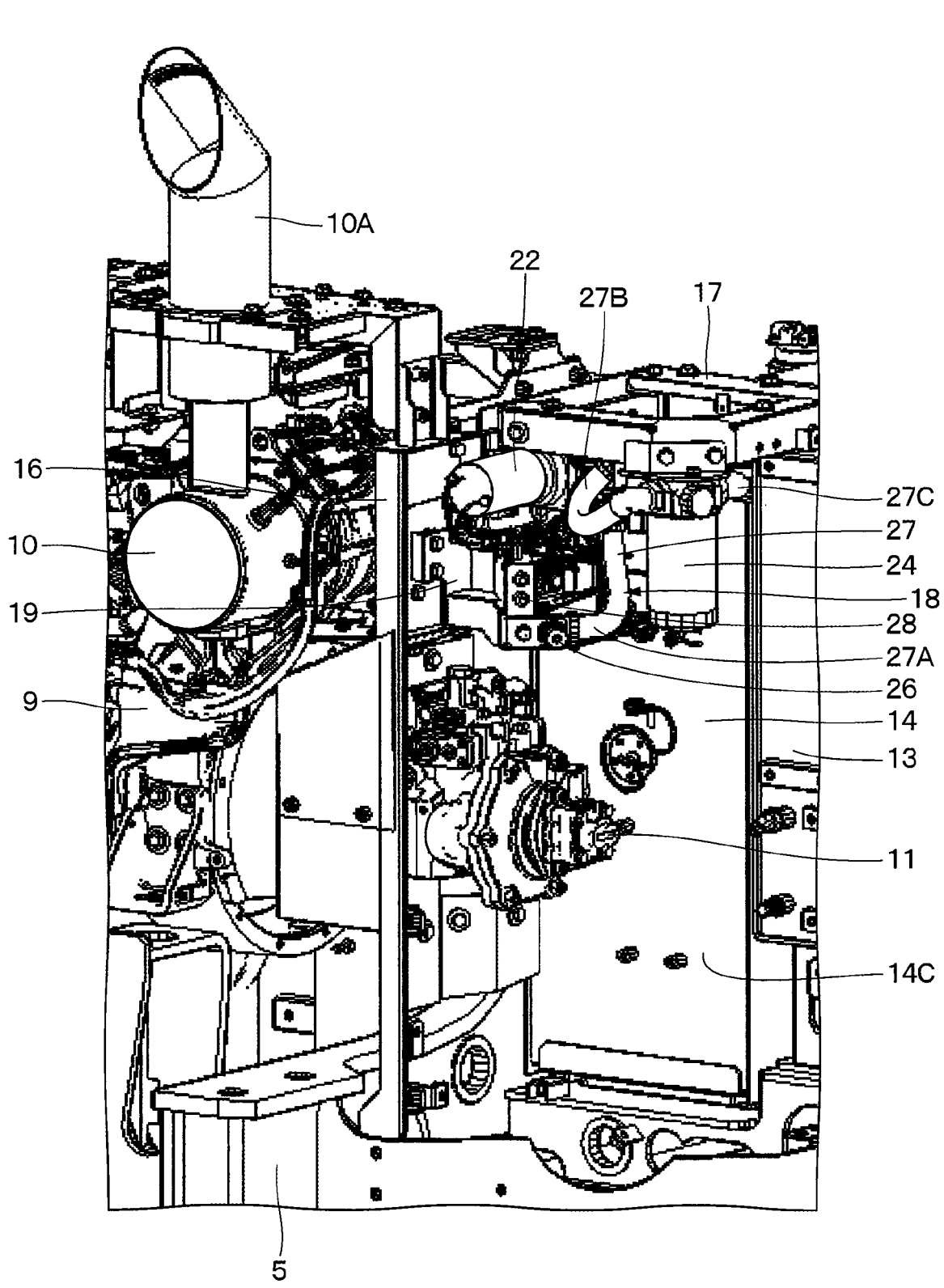
FIG. 4 is a perspective view showing a right rear side portion of the upper revolving structure.

As shown in FIGS. 2 and 4, the exhaust gas post-treatment device 10 is disposed on one side or the right side of the engine 9 and over the engine 9. Specifically, the exhaust gas post-treatment device 10 is disposed to extend in the front-and-rear direction at a position proximate to the later-described partition member 16. The exhaust gas post-treatment device 10 is connected to the exhaust pipe of the engine 9 to remove harmful substances in the exhaust gas discharged from the engine 9 and reduce exhaust noise. The exhaust gas post-treatment device 10 has a function of burning and removing harmful substance by taking in exhaust gas from the engine 9 still at high temperature. Then, the exhaust gas treated in the exhaust gas post-treatment device 10 becomes from an upward projecting tail pipe 10A to the exterior (outdoor air). The exhaust gas post-treatment device 10 becomes to high temperature soon after the start of the engine 9 due to the high-temperature exhaust gas circulating.

Herein, the height position of the exhaust gas post-treatment device 10 will be described. The exhaust gas post-treatment device 10 is disposed between the hydraulic pump 11 and an upper surface cover 15C of the exterior cover 15. For details, the exhaust gas post-treatment device 10 is disposed at a height position equivalent to a top surface 14A of the fuel tank 14.

The hydraulic pump 11 is disposed on one side or the right side of the engine 9. Specifically, the hydraulic pump 11 is disposed to be close to a lower side of the pump room 8. The hydraulic pump 11 pumps hydraulic oil to each type of hydraulic unit mounted on the hydraulic excavator 1 by allowing the engine 9 to drive the hydraulic pump.

The cab 12 is disposed on the left front side of the revolving frame 5. An operator is seated in the cab 12 to operate the hydraulic excavator 1. An operator's seat for an operator to be seated, levers and pedals for each operation (each not shown) and the like are disposed inside the cab 12.

The hydraulic oil tank 13 is disposed on a front side of the hydraulic pump 11 and the right side of the revolving frame 5. The hydraulic oil tank 13 is formed as a rectangular-shaped hollow container, for example. The hydraulic oil tank 13 stores hydraulic oil to be supplied to each type of hydraulic unit via the hydraulic pump 11.

The fuel tank 14 is located on the front side of the hydraulic pump 11 and disposed on the right side of the revolving frame 5. In other words, the fuel tank 14 is disposed adjacent to the left side of the hydraulic oil tank 13. The fuel tank 14 stores fuels to be supplied to the engine 9 and is formed as a rectangular-shaped hollow container, for example. A fuel filling opening 14B for supplying fuels from a portable fuel container and a fuel truck (each not shown), for example is disposed to project upward on the top surface 14A of the fuel tank 14. In addition, a fuel filling port 14D as other fuel filling opening is disposed on a rear surface 14C of the fuel tank 14. A downstream end of a tank side conduit portion 27C of a later-described connecting pipe 27 is connected to the fuel filling port 14D.

Herein, a rear surface of the hydraulic oil tank 13 and the rear surface 14C of the fuel tank 14 are arranged with the counterweight 6 with a desired interval. Accordingly, the rear surface of the hydraulic oil tank 13 and the rear surface 14C of the fuel tank 14 configure a front wall of the pump room 8.

As shown in FIGS. 1 and 2, the exterior cover 15 is disposed on the revolving frame 5 so as to cover an apparatus including the engine 9, the exhaust gas post-treatment device 10, the heat exchanger, the hydraulic pump 11, and the fuel filling device 18. That is, the exterior cover 15 covers the engine room. 7, the cooling air inflow chamber and the pump room 8. The exterior cover 15 is configured to include a left side cover 15A covering the left side of the cooling air inflow chamber, a right side cover 15B as a side cover covering the right side of the pump room 8, and an upper surface cover 15C covering the upper sides of the engine room 7, the cooling air inflow chamber and the pump room 8. The upper surface cover 15C is divided into multiple plates and can partially be attached or detached and opened or closed, depending on parts for maintenance.

The right side cover 15B is disposed between the counterweight 6 and the hydraulic oil tank 13. The right side cover 15B, for example, can be opened and closed in a horizontal direction. With the right side cover 15B open, operations can be performed such as maintenance of the hydraulic pump 11, the fuel filling device 18 and the like and refueling using the fuel filling device 18. In addition, an exhaust port 15B1 for discharging part of cooling air flowing from the engine room 7 to the pump room 8 to the exterior is disposed on the right side cover 15B (see FIGS. 1 and 5).

The partition member 16 is disposed between the engine 9 and the hydraulic pump 11 at a position interposed by the counterweight 6 and the fuel tank 14 in a front-and-rear direction. The partition member 16 configures a firewall parting the engine room 7 and the pump room 8. The partition member 16 is located between the engine 9, the exhaust gas post-treatment device 10, and the hydraulic pump 11 and formed as a plate extending in the front-and-rear direction and in the vertical direction. An upper portion of the partition member 16 is disposed at a position proximate to the right side of the exhaust gas post-treatment device 10.

Figure 8:
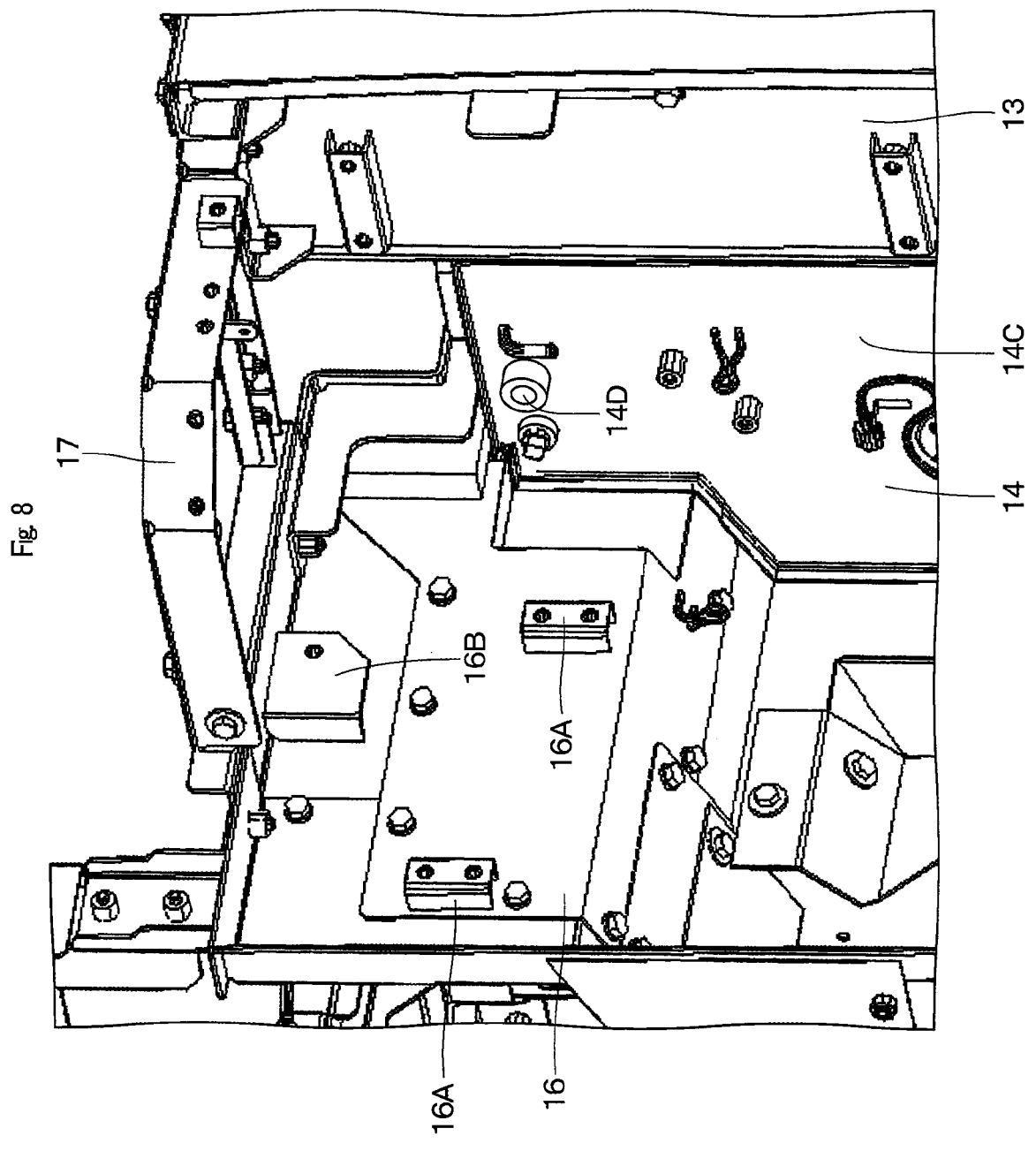

In addition, as shown in FIG. 8, 2 screw seats 16A located close to the upper portion of the partition member 16 and disposed with an interval in a front-and-rear direction and one screw seat 16B disposed over the 2 screw seats 16A with an interval are arranged on a surface on the pump room 8 side of the partition member 16. A bracket 19 of a later-described fuel filling device 18 is attached to the 2 screw seats 16A and the one screw seat 16B. Moreover, the screw seats 16A, 16B have a mounting surface at a position projecting rightward from a surface of the partition member 16. Accordingly, with the bracket 19 of the fuel filling device 18 attached to the mounting surface of the screw seats 16A, 16B, a later-described gap 21 can be formed between the partition member 16 and the bracket 19. The number and arrangement of the screw seats are not restricted to the above example.

A frame member 17 is disposed to extend laterally rightward from the upper portion of the partition member 16. The frame member 17 is formed as a rectangular frame body. The rectangular frame member 17 has, for example, a left side attached to the upper portion of the partition member 16 and an adjacent front side attached to an upper portion of the hydraulic oil tank 13. A later-described fuel filter 24 is attached to the frame member 17 at a right rear corner part close to the right side cover 15B.

Next, the configuration and function of the fuel filling device 18 that configures the characterizing portion of an embodiment of the present invention will be explained in detail.

The fuel filling device 18 is used for supplying fuels stored in an exterior oil reservoir tank (a container such as a drum) to the fuel tank 14 at a working site to which a fuel truck is not admitted. The use of such a fuel filling device 18 can readily perform a refueling operation for a short period of time.

The fuel filling device 18 is disposed in the vicinity of the exhaust gas post-treatment device 10. Specifically, the fuel filling device 18 is located between the counterweight 6 and the fuel tank 14 and disposed over the hydraulic pump 11. In addition, the fuel filling device 18 is disposed at a height position equivalent to the exhaust gas post-treatment device 10 so as to receive heat generated from the exhaust gas post-treatment device 10. Specifically, the fuel filling device 18 is located in the pump room 8 and attached to an upper area of the partition member 16. In other words, the fuel filling device 18 is located on the pump room. 8 side opposite to the exhaust gas post-treatment device 10 across the partition member 16 and attached to the partition member 16. This configuration allows the fuel filling device 18 to efficiently receive heat generated from the exhaust gas post-treatment device 10.

Herein, the fuel filling device 18 may be disposed at a height position equivalent to the exhaust gas post-treatment device 10 in the vertical direction. That is, the fuel filling device 18 may overlap part of the exhaust gas post-treatment device 10 in the vertical direction. In other words, part of the fuel filling device 18 may protrude under or over the exhaust gas post-treatment device 10.

The fuel filling device 18 is configured to include the later-described bracket 19, a fuel pump 22, a fuel filter 24, a connecting port 26, a connecting pipe 27, and a switch 28.

Figure 9:
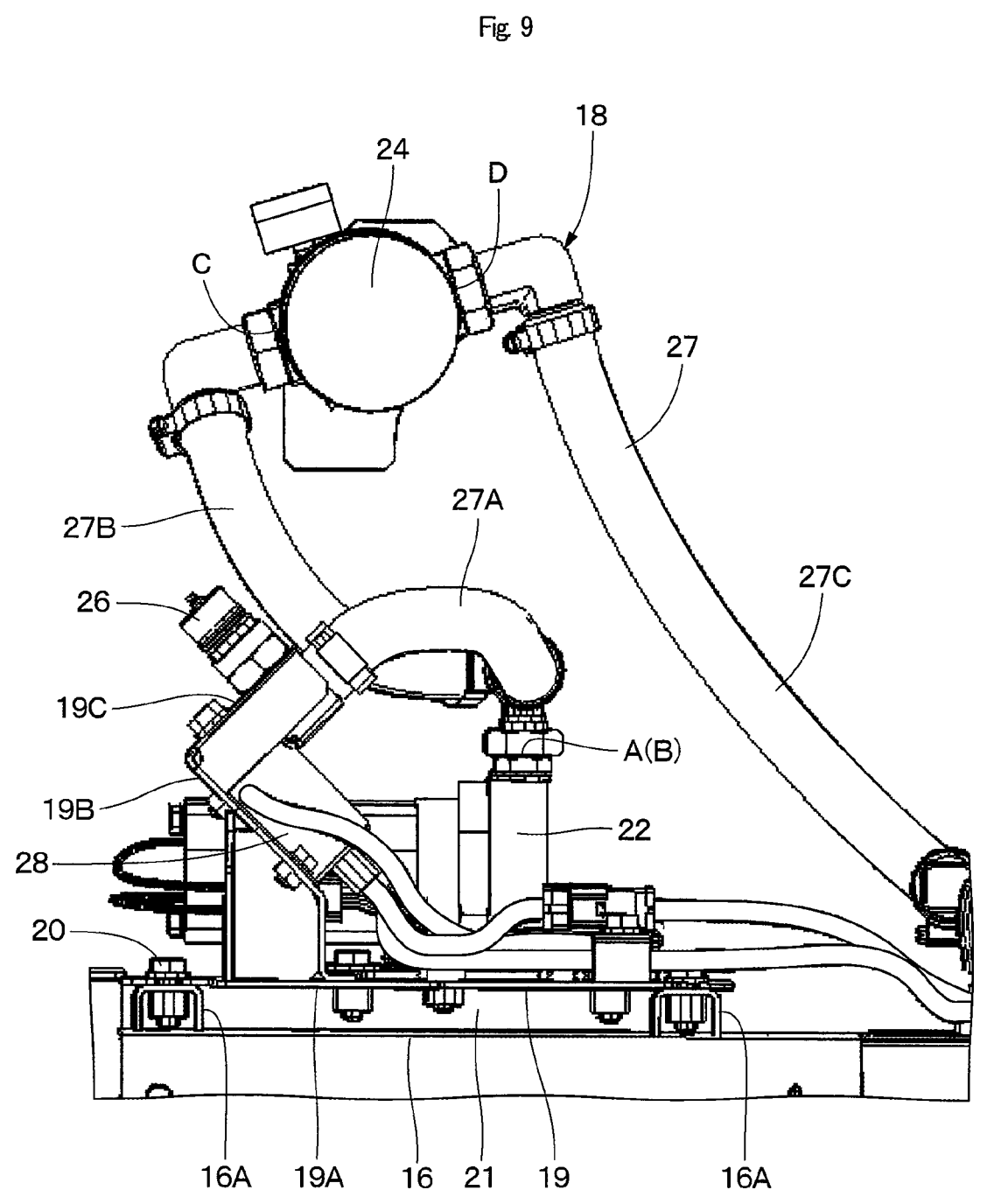
Figure 10:
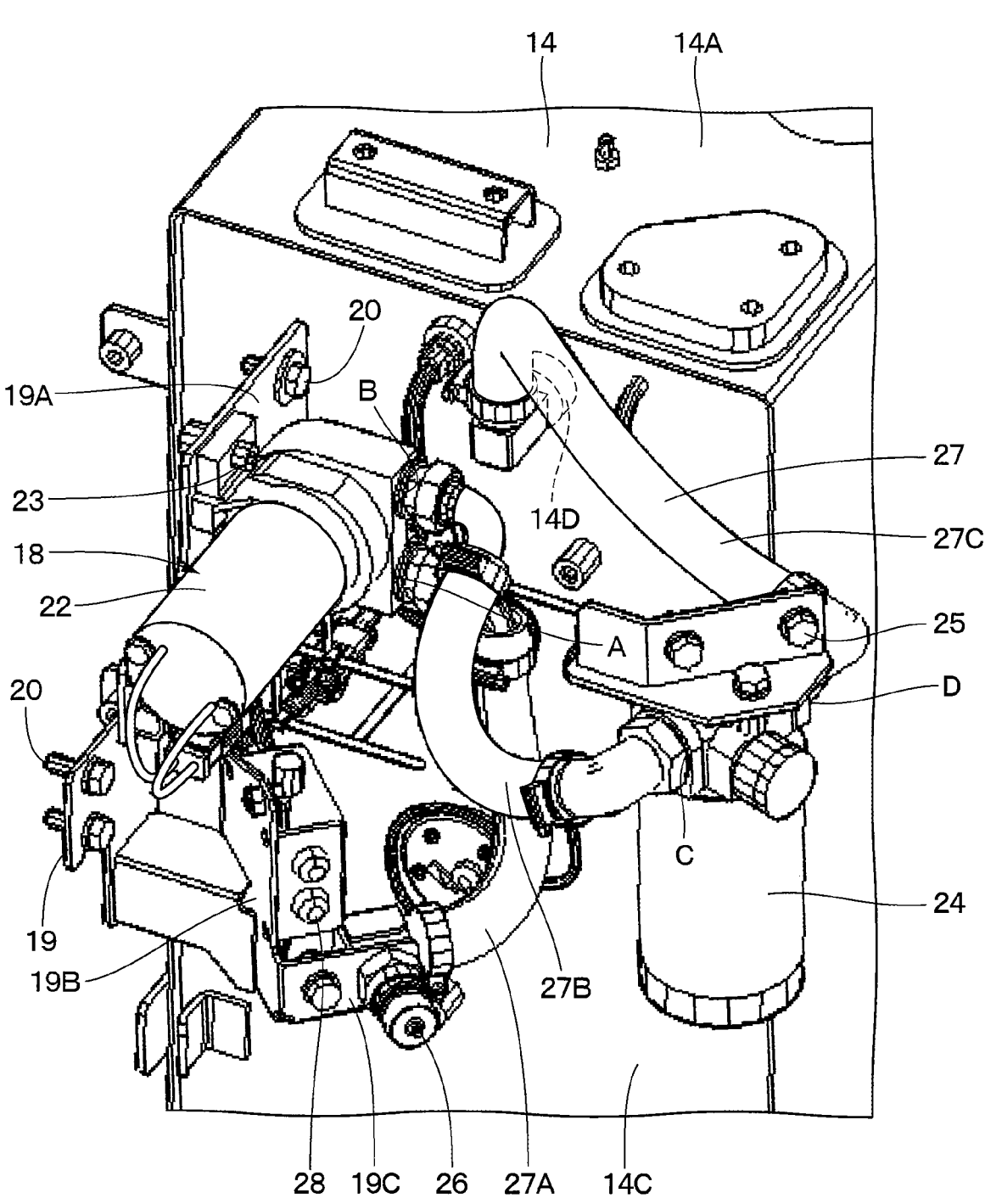
FIG. 10 is a perspective view showing the fuel filling device viewed from the upper side.

The bracket 19 is attached to the partition member 16 as a base for attaching the fuel filling device 18 to the partition member 16. As shown in FIGS. 9 and 10, the bracket 19 includes a flat base 19A opposed to the partition member 16, a switch mounting portion 19B located on a lower side of the base 19A and extending diagonally on the right rear side, and a connecting port mounting portion 19C disposed at a lowest portion of the switch mounting portion 19B. In addition, bolt through holes are disposed on the base 19A at positions corresponding to the screw seats 16A, 16B of the partition member 16 (each not shown).

The fuel pump 22 is attached to an upper position of the base 19A. The switch 28 is attached to the switch mounting portion 19B. The connecting port 26 is attached to the connecting port mounting portion 19C. Then, when the bracket 19 is attached to the partition member 16, the base 19A is pushed onto the screw seats 16A, 16B. In this state, bolts 20 are inserted into a plurality of bolt through holes to screw the screw seats 16A, 16B with the bolts 20.

As shown in FIG. 9, a gap 21 is disposed between the partition member 16 and the base 19A of the bracket 19. The gap 21 avoids overheating of the fuel filling device 18 due to the heat generated from the engine 9 and the exhaust gas post-treatment device 10 by circulating air such as cooling air flowing from the engine room 7 to the pump room 8.

The fuel pump 22 is attached to the base 19A of the bracket 19 with a bolt 23 or the like. The fuel pump 22 is composed of a plunger pump, a gear pump, a trochoid pump, and a vane pump, for example, and driven by an electric motor. A downstream end of a connecting port side conduit portion 27A of the later-described connecting pipe 27 is connected to a suction port of the fuel pump 22. In addition, an upstream end of a filter side conduit portion 27B is connected to a delivery port of the fuel pump 22.

The fuel filter 24 catches foreign matter such as dust contained in fuels with a filter element (not shown) disposed thereinto supply purified fuels to the fuel tank 14. In addition, the fuel filter 24 includes a clogging gauge (not shown) indicating the state of clogging of the filter element.

Figure 5:
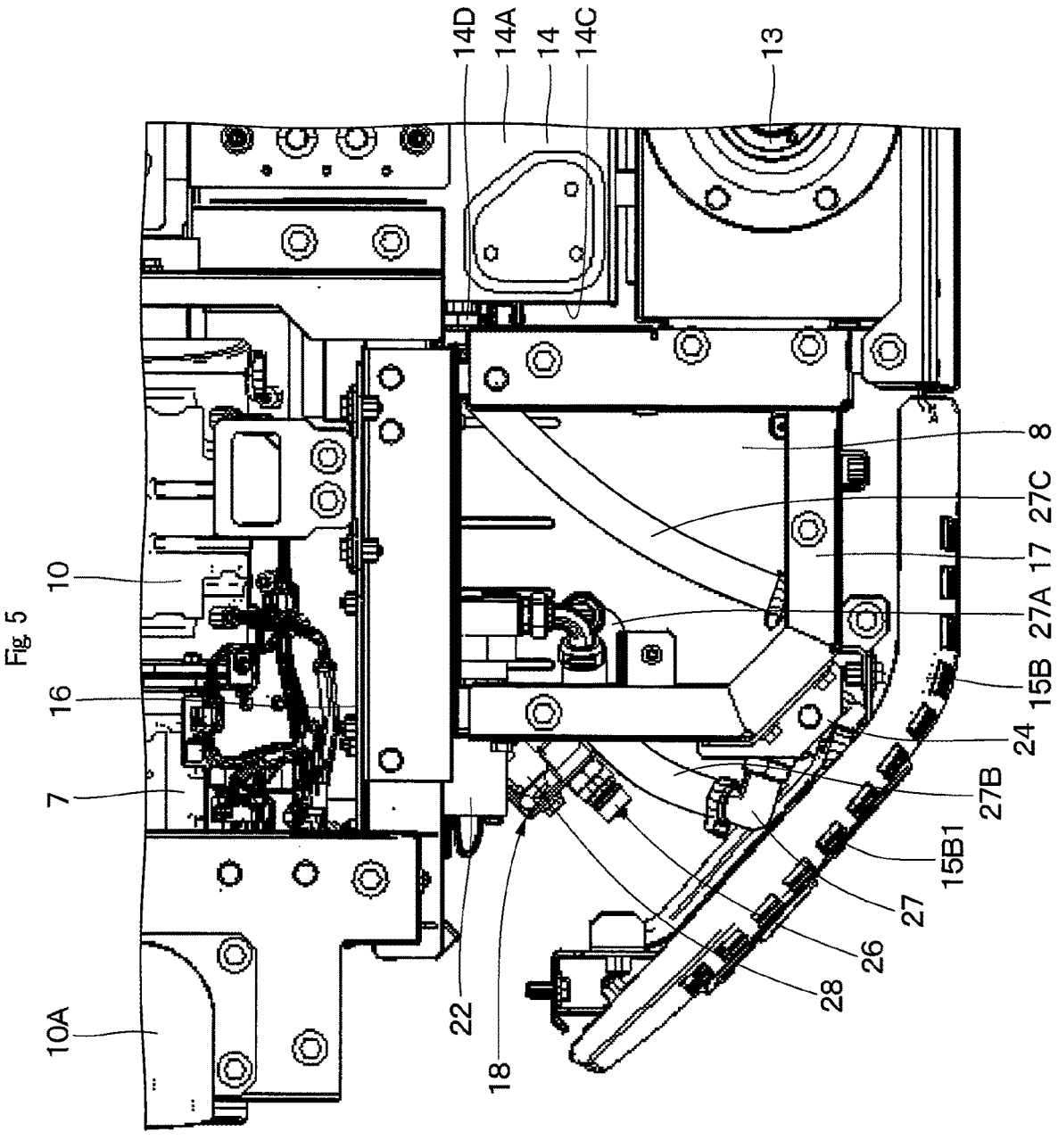
FIG. 5 is a plan view showing the right rear side portion of the upper revolving structure.
Figure 6:
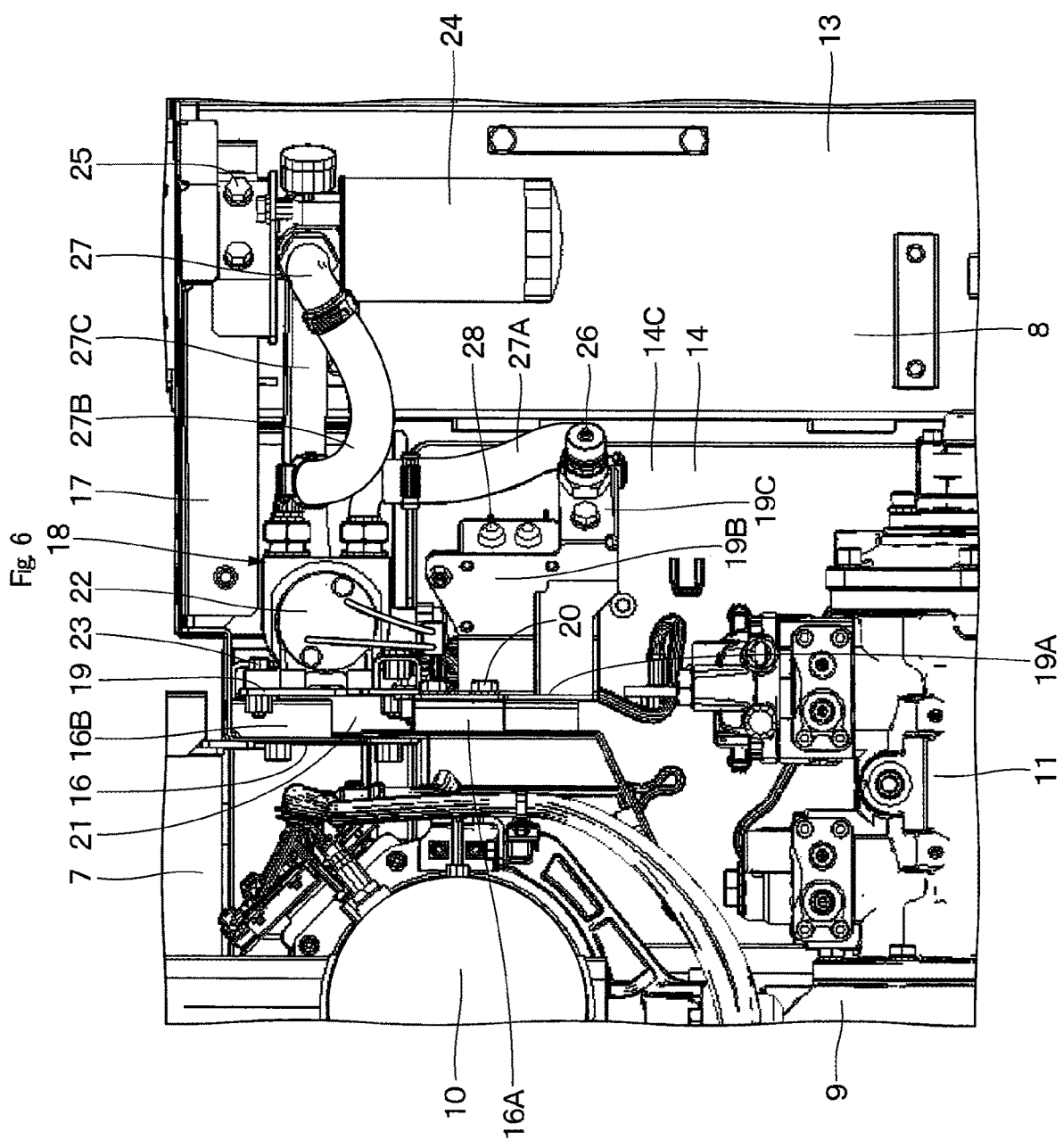
FIG. 6 is a rear view showing the right rear side portion of the upper revolving structure viewed from the rear side.
Figure 7:
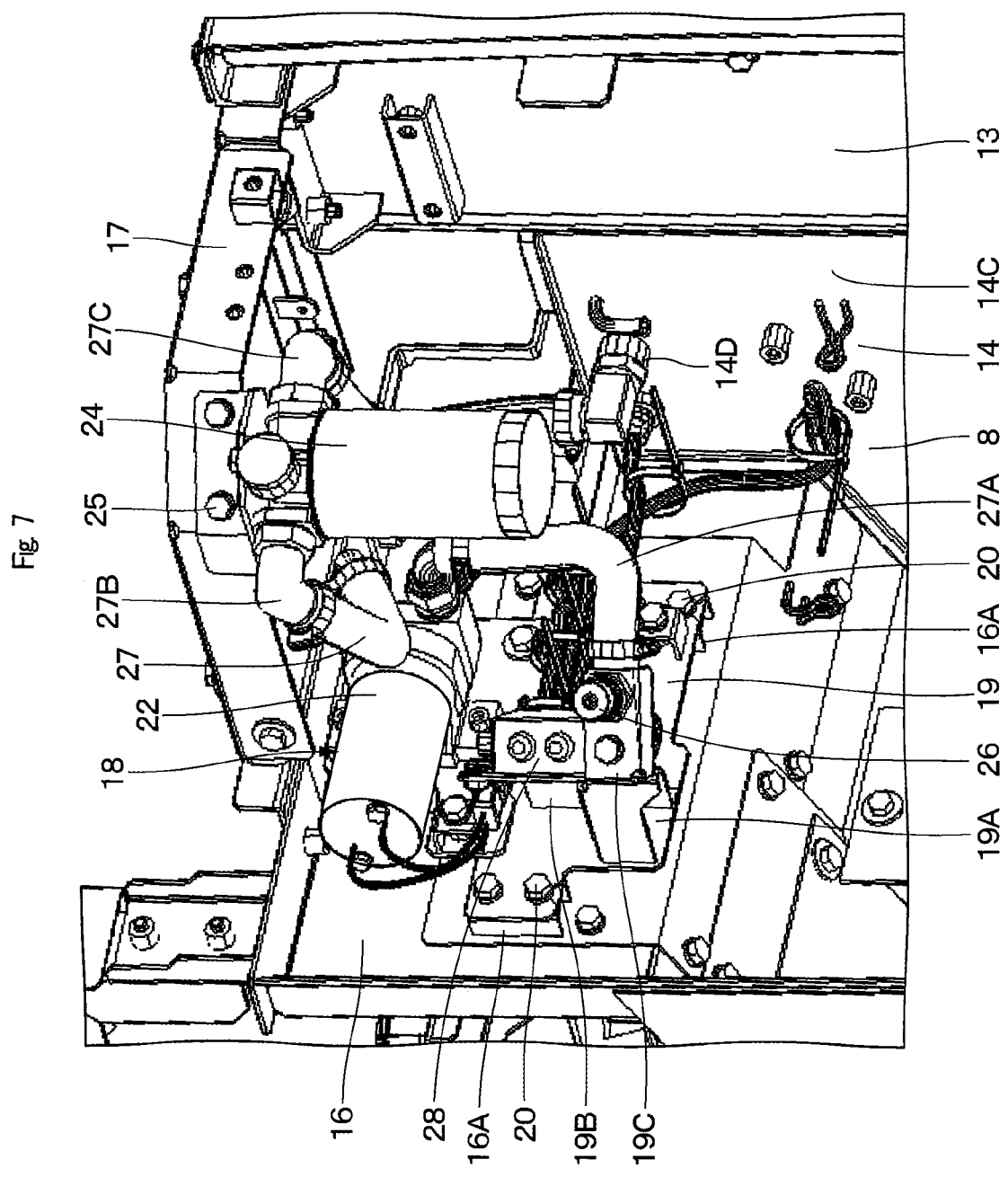

The fuel filter 24 is disposed at a position closer to the right side cover 15B than the fuel pump 22. Specifically, as shown in FIGS. 4 to 7, an upper portion of the fuel filter 24 is attached to a right rear corner part of the frame member 17 with a bolt 25. As a result, as shown in FIGS. 5 and 9, the fuel filter 24 is disposed at a position different from the fuel pump 22 in plan view. Accordingly, the fuel filter 24 is disposed in the vicinity of the right side cover 15B conveniently within arm's reach from outside.

As a result, when the right side cover 15B is opened, the clogging gauge of the fuel filter 24 can readily be inspected and the filter element can easily be replaced. In addition, even if residual fuels are evaporated upon replacement of a filter element, the evaporated fuels can readily be discharged to the exterior.

Moreover, a downstream end of a filter side conduit portion 27B of the connecting pipe 27 is connected to an inlet port of the fuel filter 24. In addition, an upstream end of the tank side conduit portion 27C is connected to an outlet port of the fuel filter.

A fuel filling hose (not shown) for sucking fuels from the exterior oil reservoir tank is connected to the connecting port 26. The connecting port 26 is disposed at a lowest portion of the fuel filling device 18. Specifically, the connecting port 26 is attached to the connecting port mounting portion 19C of the bracket 19. The connecting port 26 is configured as a one-touch joint called as "quick coupling", for example, to prevent fuel leakage from the connecting pipe 27. An upstream end of the connecting port side conduit portion 27A of the connecting pipe 27 is connected to the connecting port 26.

The connecting port 26 disposed at the lowest portion of the fuel filling device 18 is disposed at a height position conveniently within arm's reach for an operator standing on the ground, for example, equivalent to approx. 1500 to 2000 mm. As a result, when the fuel filling hose is connected to the connecting port 26, with the right side cover 15B open, an operator can connect an end portion of the fuel filling hose to the connecting port 26, only by grasping the end portion of the fuel filling hose and stretching an arm. In addition, the end of the fuel filling hose can readily be detached from the connecting port 26.

Additionally, the connecting port 26 is disposed at the lowest portion of the fuel filling device 18. Therefore, even if fuels fall in drops from the end portion of the fuel filling hose when detaching the end portion of the fuel filling hose from the connecting port 26, the fuels do not splash over an electric motor of the fuel pump 22 or the later-described switch 28.

The connecting pipe 27 connects the connecting port 26 and the fuel filling port 14D of the fuel tank 14 via the fuel pump 22 and the fuel filter 24. The connecting pipe 27 is configured by the connecting port side conduit portion 27A connecting the connecting port 26 and the suction port of the fuel pump 22, the filter side conduit portion 27B connecting the delivery port of the fuel pump 22 and the inlet port of the fuel filter 24, and the tank side conduit portion 27C connecting the outlet port of the fuel filter 24 and the fuel filling port 14D of the fuel tank 14. The connecting port side conduit portion 27A, the filter side conduit portion 27B and the tank side conduit portion 27C are configured by a flexible pressure-resistant hose or a metal pipe, for example.

Figure 3:
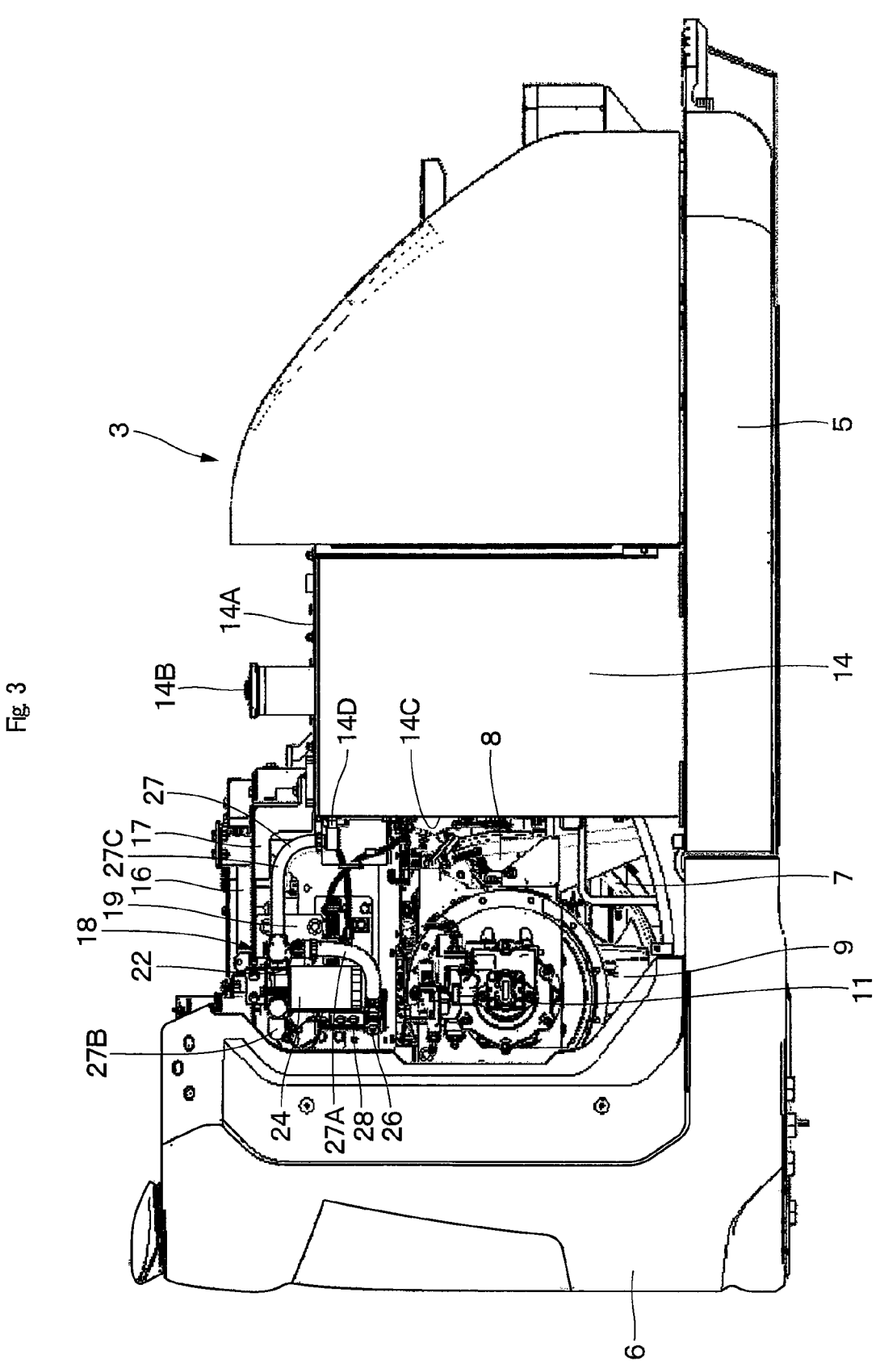

As shown in FIG. 3, the tank side conduit portion 27C is disposed at a position where the downstream end as an end portion on the fuel filling port 14D side is lower than the upstream end as an end portion on the fuel filter 24 side. As a result, upon completion of a refueling operation, all the fuels in the tank side conduit portion 27C are allowed to flow into the fuel tank 14. That is, fuel waxing in the tank side conduit portion 27C can be prevented. When the fuel waxing is generated in the tank side conduit portion 27C in particular, higher viscosity of fuels by the waxing can clog a filter (not shown) of the fuel tank 14. In this embodiment, such a drawback can be overcome beforehand.

The switch 28 is used to operate the fuel pump 22. The switch 28 is attached to the switch mounting portion 19B of the bracket 19. As a result, the switch 28 is attached to the partition member 16 via the bracket 19. The switch 28 is disposed directly above the connecting port 26 under the fuel filling device 18. As a result, when the fuel filling device 18 is operated or stopped, it is easy for an operator standing on the ground to operate the switch 28 only by stretching an arm. In addition, the switch 28 can be operated after the fuel filling hose is connected to the connecting port 26.

As shown in FIG. 5, the switch 28 is disposed at a position different from a connecting portion of the connecting pipe 27 relative to the fuel pump 22 and a connecting portion of the connecting pipe 27 relative to the fuel filter 24 in plan view. Specifically, as shown in FIGS. 9 and 10, the position of connecting the downstream end of the connecting port side conduit portion 27A and the suction port of the fuel pump 22 is defined as a connecting portion A, the position of connecting the delivery port of the fuel pump 22 and the upstream end of the filter side conduit portion 27B as a connecting portion B, the position of connecting the downstream end of the filter side conduit portion 27B and the inlet port of the fuel filter 24 as a connecting portion C, and the position of connecting the outlet port of the fuel filter 24 and the upstream end of the tank side conduit portion 27C as a connecting portion D. These connecting portions A to D are located over the switch 28 as sites of possible fuel leakage. Further, the switch 28 is disposed at a position different from the connecting portions A to D in plan view. Therefore, even with fuel leakage from the connecting portions A to D when replacing the connecting pipe 27, fuel splashing over the switch 28 can be prevented.

The hydraulic excavator 1 of this embodiment is configured as described above, and subsequently, the operation of the hydraulic excavator 1 will be explained.

An operator seated in the cab 12 starts the engine 9 to drive the hydraulic pump 11. In this state, the operator can advance or retreat the lower traveling structure 2 by operating a traveling lever. Meanwhile, the operator can perform excavating work of earth and sand by operating an operating lever to rotate the working mechanism 4.

When the fuel tank 14 is refueled, a fuel truck (not shown) can supply fuels from the fuel filling opening 14B of the fuel tank 14. In addition, at a working site to which a fuel truck is not admitted, the fuel tank 14 is refueled from an exterior oil reservoir tank (such as a drum), using the fuel filling device 18 mounted on the hydraulic excavator 1.

Then, an operation of refueling the fuel tank 14 using the fuel filling device 18 will be explained. First, the right side cover 15B of the exterior cover 15 is opened to connect one end portion of the fuel filling hose to the connecting port 26 and insert other end portion of the fuel filling hose into the oil reservoir tank. Next, the switch 28 is operated to drive the fuel pump 22. As a result, fuels in the oil reservoir tank are supplied to the fuel tank 14 through the fuel filling hose and the connecting pipe 27. At the refueling, the fuel filter 24 removes dusts contained in the fuels. Then, when the fuel tank 14 is refueled with a constant amount of fuel, the fuel pump 22 will be stopped by an automatic or manual operation (operating the switch 28). When the fuel pump 22 is stopped, the fuel filling hose is detached from the connecting port 26 and the right side cover 15B is closed.

Herein, the hydraulic excavator 1 is operated even at working site in cold areas. Hydraulic excavators operated at a working site in such cold areas are prone to higher viscosity of wax constituents in fuels at low temperature, "waxing". When the waxing is caused in residual fuels in the fuel filling device 18, the fuel tank 14 cannot be refueled using the fuel filling device 18. Therefore, an operator needs much effort and time for coming up to the upper revolving structure 3, while holding the fuel tank filled with fuels, to supply fuels from the fuel filling opening 14B.

Therefore, in this embodiment, the fuel filling device 18 for refueling the fuel tank 14 is disposed in the vicinity of the exhaust gas post-treatment device 10. Specifically, the fuel filling device 18 is disposed over the hydraulic pump 11 and at a height position equivalent to the exhaust gas post-treatment device 10. Therefore, even if waxing is caused in residual fuels in the fuel filling device 18, the start of the engine 9 allows the heat generated from the exhaust gas post-treatment device 10 to be transferred to the fuel filling device 18 to overcome the waxing of the fuel filling device 18. Notably, the exhaust gas post-treatment device 10 is a high-temperature area soon after the start of the engine 9 due to the high-temperature exhaust gas circulating. This property allows the fuel filling device 18 to be heated for a short period of time by the heat generated from the exhaust gas post-treatment device 10. Consequently, the waxing in the fuel filling device 18 can be overcome for a short period of time to improve the operational efficiency at the refueling.

For example, with a small amount of fuels left in the fuel tank 14, the engine 9 is started to potentially render the vehicle out of gas a few minutes after the start of the engine 9. In addition, even the start of the engine 9 with a small amount of fuels left in the fuel tank 14 and an immediate traveling on the slope may render the vehicle out of gas, depending on the tilt of the fuel tank 14. On the other hand, since the fuel filling device 18 of this embodiment is disposed in the vicinity of the exhaust gas post-treatment device 10 that becomes to high temperature soon after the start of the engine 9, the waxing can be overcome for a short period of time after the start of the engine 9. This advantage allows the fuel filling device 18 to refuel the fuel tank 14.

In addition, in this embodiment, the fuel filling device 18 is disposed at a high position over the hydraulic pump 11. Therefore, the fuel pump 22, the fuel filter 24, the connecting pipe 27 and the like can visually be confirmed at one time by looking up at the fuel filling device 18 for easy inspection.

Moreover, a space over the hydraulic pump 11 can effectively be used to install the fuel filling device 18. This advantage allows the fuel filling device 18 to be disposed even in a small-revolving type hydraulic excavator and a small hydraulic excavator with a limited space for installing the upper revolving structure 3.

The fuel pump 22 and the fuel filter 24 are arranged at different positions in plan view. Therefore, spaces can be secured around the fuel pump 22 and the fuel filter 24 and inspecting and repairing operations can readily be performed.

The fuel filling device 18 includes the connecting port 26 to which the fuel filling hose for sucking fuels from the exterior oil reservoir tank is connected. Then, the connecting port 26 is disposed at the lowest portion of the fuel filling device 18. Therefore, an operator can readily connect the end portion of the fuel filling hose to the connecting port 26 and disconnect it, only by grasping the end portion of the fuel filling hose and stretching an arm. In addition, when the fuel filling hose is attached or detached, fuel leakage can visually be confirmed only by looking upward. Moreover, even if fuels fall in drops from the end portion of the fuel filling hose when the end portion of the fuel filling hose is detached from the connecting port 26 as the lowest part, the fuels do not splash over the electric motor of the fuel pump 22 or the switch 28. These advantages can satisfy the durability and reliability of the fuel filling device 18. In addition, cleaning operations can be omitted.

The connecting pipe 27 includes the tank side conduit portion 27C connecting the fuel filter 24 and the fuel filling port 14D disposed on the rear surface 14C of the fuel tank 14. In addition, the tank side conduit portion 27C is disposed at a position where the downstream end on the fuel filling port 14D side is lower than the upstream end on the fuel filter 24 side. Therefore, upon completion of a refueling operation, all the fuels in the tank side conduit portion 27C are allowed to flow into the fuel tank 14. That is, fuel waxing in the tank side conduit portion 27C directly connected to the fuel tank 14 can be prevented to improve reliability.

The fuel filling device 18 includes the switch 28 operating the fuel pump 22. The switch 28 is disposed at positions different from the connecting portions A, B of the connecting pipe 27 relative to the fuel pump 22 and the connecting portions C, D of the connecting pipe 27 relative to the fuel filter 24 in plan view. Therefore, even with fuel leakage from the connecting portions A to D, fuel splashing over the switch 28 can be prevented to satisfy the durability of the switch 28.

The upper revolving structure 3 includes the openable right side cover 15B covering the right side of the hydraulic pump 11. The fuel filter 24 is disposed closer at a position to the right side cover 15B than the fuel pump 22. As a result, when the right side cover 15B is opened, the clogging gauge of the fuel filter 24 can readily be inspected and the filter element can easily be replaced. In addition, upon replacement of a filter element, evaporated fuels can readily be discharged to the exterior.

The partition member 16 parting the engine room 7 on the engine 9 side and the pump room 8 on the hydraulic pump 11 side is disposed between the engine 9 and the hydraulic pump 11. The fuel filling device 18 is located on the pump room 8 side opposite to the exhaust gas post-treatment device 10 across the partition member 16 and attached to the partition member 16. As a result, the heat generated from the exhaust gas post-treatment device 10 can promptly be transferred to the fuel filling device 18.

The fuel filling device 18 includes the bracket 19 to be attached to the partition member 16 with the gap 21 formed between the partition member 16 and the fuel filling device 18. The gap 21 between the partition member 16 and the bracket 19 can circulate air such as cooling air flowing from the engine room 7 to the pump room 8. As a result, the gap 21 can be adjusted so as to avoid overheating of the fuel filling device 18 due to the heat generated from the engine 9 and the exhaust gas post-treatment device 10.

The upper revolving structure 3 includes the frame member 17 extending laterally rightward from the upper portion of the partition member 16. The fuel filling device 18 includes the switch 28 operating the fuel pump 22. In addition, the fuel pump 22 and the switch 28 are attached to the partition member 16 via the bracket 19. The upper portion of the fuel filter 24 is attached to the frame member 17. Therefore, the fuel pump 22 and the fuel filter 24 can be arranged at different positions in plan view.

Moreover, the embodiments have been explained by taking the example where the crawler-type hydraulic excavator 1 is illustrated as a construction machine. However, not limited thereto, and for example, such a crawler-type hydraulic excavator 1 may be replaced with a wheel type hydraulic excavator. In addition, such hydraulic excavators can widely be used for other types of construction machines such as a hydraulic crane.

DESCRIPTION OF REFERENCE NUMERALS

1: Hydraulic excavator (Construction machine)
2: Lower traveling structure
3: Upper revolving structure
7: Engine room
8: Pump room
9: Engine
10: Exhaust gas post-treatment device
11: Hydraulic pump
14: Fuel tank
14C: Rear surface
14D: Fuel filling port
15: Exterior cover
15B: Right side cover
16: Partition member
17: Frame member
18: Fuel filling device
19: Bracket
21: Gap
22: Fuel pump
24: Fuel filter 26: Connecting port
27: Connecting pipe
27C: Tank side conduit portion
28: Switch
A to D: Connecting portion

The invention claimed is:

1. A construction machine comprising a lower traveling structure and an upper revolving structure disposed rotatably on the lower traveling structure, wherein the upper revolving structure comprises:

an engine;

an exhaust gas post-treatment device treating exhaust gas discharged from the engine;

a fuel tank storing fuels; and a fuel filling device refueling the fuel tank, wherein the fuel filling device comprises: a fuel pump; a fuel filter; a connecting port that is connected to a fuel filling hose for sucking fuels from an exterior oil reservoir tank; and a connecting pipe that connects the connecting port, the fuel pump and the fuel filter via conduit portions, the fuel filling device is disposed in the vicinity of the exhaust gas post-treatment device, and the fuel filter is positioned farther from the exhaust gas post-treatment device than the fuel pump, the connecting port and the conduit portions.

2. The construction machine according to claim 1, comprising a hydraulic pump driven by the engine, wherein the fuel filling device is disposed over the hydraulic pump.

3. The construction machine according to claim 2, wherein the exhaust gas post-treatment device is disposed on one side of and over the engine, the hydraulic pump is disposed on the one side of the engine, wherein the fuel filling device is disposed over the hydraulic pump and at a height position equivalent to the exhaust gas post-treatment device.

4. The construction machine according to claim 1, wherein the fuel pump and the fuel filter are arranged at different positions in plan view.

5. The construction machine according to claim 4, wherein the connecting pipe comprises a tank side conduit portion connecting the fuel filter and a fuel filling port disposed on a rear surface of the fuel tank, wherein the tank side conduit portion is disposed at a position where an end portion on the fuel filling port side is lower than an end portion on the fuel filter side.

6. The construction machine according to claim 4, wherein the fuel filling device comprises a switch operating the fuel pump, wherein the switch is disposed at a position different from a connecting portion of the connecting pipe relative to the fuel pump and a connecting portion of the connecting pipe relative to the fuel filter in plan view.

7. The construction machine according to claim 1, comprising a hydraulic pump driven by the engine, wherein the upper revolving structure comprises an openable side cover covering a side surface of the hydraulic pump, wherein the fuel filter is disposed at a position closer to the side cover than the fuel pump.

8. A construction machine comprising a lower traveling structure and an upper revolving structure disposed rotatably on the lower traveling structure, wherein the upper revolving structure comprises:

an engine;

an exhaust gas post-treatment device treating exhaust gas discharged from the engine;

a fuel tank storing fuels; and a fuel filling device refueling the fuel tank, wherein the fuel filling device is disposed in the vicinity of the exhaust gas post-treatment device, and the fuel filling device further comprises a connecting port to which a fuel filling hose for sucking fuels from an exterior oil reservoir tank is connected, wherein the connecting port is disposed at a lowest portion of the fuel filling device.

9. A construction machine comprising a lower traveling structure and an upper revolving structure disposed rotatably on the lower traveling structure, wherein the upper revolving structure comprises:

an engine;

an exhaust gas post-treatment device treating exhaust gas discharged from the engine;

a hydraulic pump driven by the engine;

a fuel tank storing fuels; and a fuel filling device refueling the fuel tank, wherein the fuel filling device is disposed in the vicinity of the exhaust gas post-treatment device over the hydraulic pump, and a partition member parting an engine room on the engine side and a pump room on the hydraulic pump side is disposed between the engine and the hydraulic pump, wherein the fuel filling device is located on the pump room side opposite to the exhaust gas post-treatment device across the partition member and attached to the partition member.

10. The construction machine according to claim 9, wherein the fuel filling device comprises a bracket attached to the partition member with a gap formed between the partition member and the fuel filling device.

11. The construction machine according to claim 10, wherein the upper revolving structure comprises a frame member extending laterally from an upper portion of the partition member, the fuel filling device comprises a fuel pump, a fuel filter, a connecting pipe and a switch, wherein the fuel pump and the switch are attached to the partition member via the bracket, and the fuel filter is attached to the frame member.

* * * * *